(12) United States Patent
Xiao et al.

(10) Patent No.: US 9,240,597 B2
(45) Date of Patent: Jan. 19, 2016

(54) NI MODIFIED CERAMIC ANODES FOR DIRECT-METHANE SOLID OXIDE FUEL CELLS

(75) Inventors: Guoliang Xiao, Columbia, SC (US); Fanglin Chen, Irmo, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 13/271,559

(22) Filed: Oct. 12, 2011

(65) Prior Publication Data

US 2012/0094218 A1 Apr. 19, 2012

Related U.S. Application Data

(60) Provisional application No. 61/404,996, filed on Oct. 13, 2010.

(51) Int. Cl.
| | | |
|---|---|---|
| *H01M 8/10* | (2006.01) | |
| *H01M 4/88* | (2006.01) | |
| *H01M 8/12* | (2006.01) | |
| *H01M 4/90* | (2006.01) | |
| *C04B 35/01* | (2006.01) | |
| *C04B 35/495* | (2006.01) | |
| *C04B 35/626* | (2006.01) | |
| *C01G 49/00* | (2006.01) | |

(Continued)

(52) U.S. Cl.
CPC ............ *H01M 4/881* (2013.01); *C01G 49/0036* (2013.01); *C01G 53/04* (2013.01); *C04B 35/01* (2013.01); *C04B 35/495* (2013.01); *C04B 35/6267* (2013.01); *H01M 4/9033* (2013.01); *H01M 8/1213* (2013.01); *H01M 8/1253* (2013.01); *C01P 2002/34* (2013.01); *C01P 2002/72* (2013.01); *C04B 2235/3206* (2013.01); *C04B 2235/3213* (2013.01); *C04B 2235/3227* (2013.01); *C04B 2235/3272* (2013.01); *C04B 2235/3275* (2013.01); *C04B 2235/3286* (2013.01); *C04B 2235/616* (2013.01); *C04B 2235/768* (2013.01); *H01M 4/8621* (2013.01); *H01M 4/8889* (2013.01); *Y02E 60/521* (2013.01); *Y02E 60/525* (2013.01)

(58) Field of Classification Search
CPC . H01M 4/8621; H01M 4/881; H01M 4/8889; H01M 4/9033; H01M 8/1213; H01M 8/1253; Y02E 60/521; Y02E 60/525
USPC .................. 429/479, 486–489, 535
See application file for complete search history.

(56) References Cited

U.S. PATENT DOCUMENTS 189,582 A1 8/2011 Chen et al.
2004/0001994 A1* 1/2004 Marina et al. .................. 429/40

(Continued)

OTHER PUBLICATIONS

Liu et al. A Novel Electrode Material for Symmetrical SOFCs, Advanced Materials, vol. 22, Issue 48, pp. 5478-5482.*

(Continued)

*Primary Examiner* — Patrick Ryan
*Assistant Examiner* — Ben Lewis
(74) *Attorney, Agent, or Firm* — Dority & Manning, P.A.

(57) ABSTRACT

In accordance with certain embodiments of the present disclosure, a method for fabricating a solid oxide fuel cell is described. The method includes synthesizing a composition having a perovskite present therein. The method further includes applying the composition on an electrolyte support to form an anode and applying Ni to the composition on the anode.

15 Claims, 4 Drawing Sheets

(51) Int. Cl.
*C01G 53/04* (2006.01)
*H01M 4/86* (2006.01)

(56) References Cited

U.S. PATENT DOCUMENTS

| | | | | |
|---|---|---|---|---|
| 2005/0053812 | A1* | 3/2005 | Hickey et al. | 429/21 |
| 2007/0003475 | A1* | 1/2007 | Lim et al. | 423/648.1 |
| 2008/0102340 | A1* | 5/2008 | Kawakami et al. | 429/33 |
| 2008/0169449 | A1* | 7/2008 | Mundschau | 252/373 |
| 2009/0061272 | A1* | 3/2009 | Blennow et al. | 429/27 |
| 2009/0159853 | A1* | 6/2009 | Sengupta et al. | 252/500 |

OTHER PUBLICATIONS

Liu et al. (Perovskite Sr2Fe1.5Mo0.5O6-δ as electrode materials for symmetrical solid oxide electrolysis cells, International Journal of Hydrogen Energy, vol. 35, Issue 19, Oct. 2010, pp. 10039-10044, Available online Aug. 30, 2010, SciVerse Science Direct).*

Liu et al. (Perovskite Sr2Fe1.5Mo0.506-6 as electrode materials for symmetrical solid oxide electrolysis cells, International Journal of Hydrogen Energy, vol. 35, Issue 19, Oct. 2010, pp. 10039-10044, Available online Aug. 30, 2010, SciVerse Science Direct).*

Abbas et al., "Hydrogen Production by Methane Decomposition: A Review", International Journal of Hydrogen Energy, vol. 35, No. 3, Feb. 2010, pp. 1160-1190.

Edwards et al., "The Chemistry of Methane Reforming with Carbon Dioxide and Its Current and Potential Applications", Fuel Processing Technology, vol. 42, No. 2-3, Apr. 1995, pp. 269-289.

Goodenough et al., "Alternative Anode Materials for Solid Oxide Fuel Cells", Journal of Power Sources, vol. 173, No. 1, Nov. 2007, pp. 1-10.

Huang et al., "Double Perovskite Anode Materials $Sr_2MMoO_6$ (M=Co, Ni) for Solid Oxide Fuel Cells", Chemistry of Materials, vol. 21, No. 11, May 2009, pp. 2319-2326.

Huang et al., "Double Perovskites as Anode Materials for Solid-Oxide Fuel Cells", Science, vol. 312, No. 5771, Apr. 2006, pp. 254-257.

Huang et al., Solid Oxide Fuel Cell Technology: Principles, Performance and Operations, Woodhead Publishing, Cambridge, 2009.

Lin et al., "Direct Operation of Solid Oxide Fuel Cells with Methane Fuel", Solid State Ionics, vol. 176, No. 23-24, Jul. 2005, pp. 18271835.

Liu et al., "A Novel Electrode Material for Symmetrical SOFCs", Advanced Materials, vol. 22, No. 48, Dec. 2010, pp. 5478-5482.

McIntosh et al., "Direct Hydrocarbon Solid Oxide Fuel Cells", Chemical Reviews, vol. 104, No. 10, 2004, pp. 4845-4865.

Ruiz-Morales et al., "Disruption of Extended Defects in Solid Oxide Fuel Cell Anodes for Methane Oxidation", Nature, vol. 439, Feb. 2006, pp. 568-571.

Song, "Fuel Processing for Low-Temperature and High-Temperature Fuel Cells: Challenges, and Opportunities for Sustainable Development in the $21^{st}$ Century", Catalyst Today, vol. 77, No. 1-2, Dec. 2002, pp. 17-49.

Steel et al., "Oxidation of Methane in Solid State Electrochemical Reactors", Solid State Ionics, vol. 28-30, Part 2, Sep. 1988, pp. 1547-1552.

Tao et al., "A Redox-Stable Efficient Anode for Solid-Oxide Fuel Cells", Nature Materials, vol. 2, No. 5, May 2003, pp. 320-323.

Wang et al., "Carbon Dioxide Reforming of Methane to Produce Synthesis Gas Over Metal-Supported Catalysts: State of the Art", Energy Fuels, vol. 10, No. 4, Jul. 1996, pp. 896-904.

* cited by examiner

ન્ય MODIFIED CERAMIC ANODES FOR DIRECT-METHANE SOLID OXIDE FUEL CELLS

CROSS REFERENCE TO RELATED APPLICATION

The present application claims is based on and claims priority to U.S. Provisional Application Ser. No. 61/404,996, filed Oct. 13, 2010, which is incorporated by reference herein in its entirety.

GOVERNMENT SUPPORT CLAUSE

The present invention was developed with funding from the US Department of Energy under award DE-SC0001061. Therefore, the government retains certain rights in this invention.

BACKGROUND

Solid oxide fuel cells (SOFCs) can potentially utilize hydrocarbon fuels without precious metal catalysts. As methane is the simplest hydrocarbon fuel and natural gas (with methane as the main component) is readily available, direct-methane SOFCs have attracted great attention and the catalytic activity of the anode materials plays an important role for this application. Among the non-precious metals, Ni shows impressive catalytic activity in steam-reforming methane, but suffers significant carbon deposition under low steam content which is mainly caused by methane thermal cracking. Such degradation can be mitigated by selection of appropriate catalyst supports and by control of the particle size, dispersion and stabilization of the metallic catalyst particles. However, these strategies are not suitable for the conventional Ni-cermet anode since it usually contains a large volume ratio of Ni to maintain sufficient electrical conductivity. This feature makes it easier for carbon formation to occur on the excessive Ni surface. Additionally, the large ratio of Ni tends to cause the anode sintering at high operating temperatures and more serious volume change during redox cycles.

Mixed ionic and electronic conductors (MIECs) have recently been explored as anode materials for direct-hydrocarbon SOFCs. However, the electrical conductivity and the catalytic activity of the most reported MIEC ceramics are still not satisfactory. Without precious metal catalysts, the cell performances are limited, especially when directly operated with hydrocarbon fuels.

Thus, improvements in anode materials are desirable.

SUMMARY

Advantages of the invention will be set forth in part in the following description, or may be obvious from the description, or may be learned through the practice of the invention.

In accordance with certain embodiments of the present disclosure, a method for fabricating a solid oxide fuel cell is described. The method includes synthesizing a composition having a perovskite present therein. The method further includes applying the composition on an electrolyte support to form an anode and applying Ni to the composition on the anode.

In certain aspects of the present disclosure, a solid oxide fuel cell is disclosed. The solid oxide fuel cell includes an anode having a perovskite on an electrolyte support. The electrolyte support of the anode further includes Ni.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

DETAILED DESCRIPTION

Figure 1:
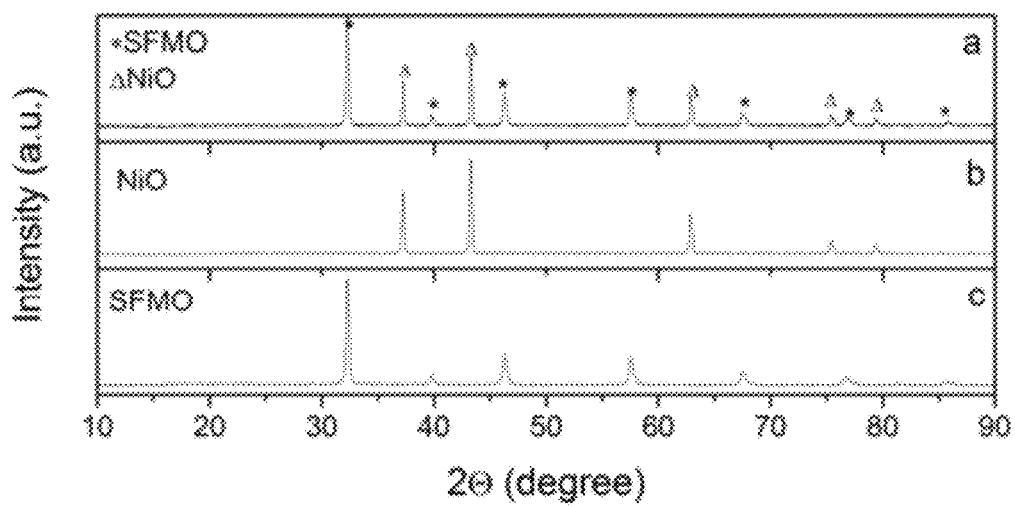
FIG. 1 illustrates XRD pattern of the mixed powder of SFMO and NiO in accordance with certain aspects of the present disclosure.

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

Recently, a novel perovskite $Sr_2Fe_{1.5}Mo_{0.5}O_6$ (SFMO) has been described in U.S. patent application Ser. No. 13/020, 356, incorporated by reference herein, to show high electrochemical performance as an anode material in SOFCs operating with hydrogen as fuel wherein the relatively high electrical conductivity can promote the catalytic activity of other metallic catalysts. Accordingly, dispersing a small amount of Ni on the SFMO anode as catalyst can improve the anode performance while avoiding carbon deposition from the conventional Ni-cermet anode for direct methane SOFCs.

In the present disclosure, $La_{0.8}Sr_{0.2}Ga_{0.83}Mg_{0.17}O_3$ (LSGM) electrolyte supported single cells with $La_{0.6}Sr_{0.4}Co_{0.2}Fe_{0.8}O_3$ (LSFC) as the cathode and Ni-modified SFMO as the anode were fabricated for direct utilization of methane fuel. The LSGM electrolyte substrate was made from pressing LSGM pellets and then sintering at 1400° C. for 5 h. The inks of anode SFMO (with 10 wt % pore former) and cathode LSCF were then screen printed on the two sides of the LSGM electrolyte pellet. The effective area of the electrode was controlled by the area of the cathode which was about 0.33 $cm^{-2}$. The anode and the cathode together with the LSGM electrolyte were then co-fired in air at 1100° C. for 1 h. For the Ni modified anode, the SFMO anode of the co-fired cell was infiltrated with $Ni(NO_3)_2$ solution and then fired at 500° C. for 1 h prior to the electrochemical testing.

Since Au is inert to methane oxidation, Au paste was used as the contact layer for current collection on the anode surface. Ambient air was used as oxidant. The flow rate of the fuel gas was set at 40 ml $min^{-1}$. Prior to any electrochemical measurement, the cell was stabilized for 10 h when the fuel gas was switched from $H_2$ to $CH_4$. Fuel cell performance was measured with a Versa STAT 3-400 test system (Princeton Applied Research). Introduction of a small amount of Ni phase in the SFMO anode significantly enhanced the cell performance in both $H_2$ and $CH_4$. With the ambient air as the oxidant, the peak power density of the fuel cells with t SFMO as anode is 0.291 W cm$^{-2}$ in wet $H_2$ (3 vol % $H_2O$) and only 0.033 W cm$^{-2}$ in wet $CH_4$ (3 vol % $H_2O$) at 800° C. With the same testing conditions, the peak power density of fuel cells with Ni-SFMO as anode reaches 1.134 W cm$^{-2}$ in wet $H_2$ (3 vol % $H_2O$) and 0.669 W cm$^{-2}$ in wet $CH_4$ (3 vol % $H_2O$). Further, the cell performance is also stable when operating with $CH_4$ fuel, indicating that the carbon formation on Ni surface can be suppressed by controlling the dispersion and loading about 0.1 to about 5 weight percent of Ni on the SFMO anodes. Considering the simple anode fabrication procedure and the relatively low cost of the anode materials, Ni modified SFMO ceramic anode shows great promise for direct-methane solid oxide fuel cells.

The following examples are meant to illustrate the disclosure described herein and are not intended to limit the scope of this disclosure.

EXAMPLES

In this study, $La_{0.8}Sr_{0.2}Ga_{0.83}Mg_{0.17}O_3$ (LSGM) electrolyte supported single cells with $La_{0.6}Sr_{0.4}Co_{0.2}Fe_{0.8}O_3$ (LSFC) as the cathode and Ni-modified SFMO as the anode were fabricated and tested for direct utilization of methane fuel. The reason for using SFMO as anode material is its high electrical conductivity and redox stability. A small amount of NiO (~2 wt %) was applied to modify the performance of the ceramic anode by infiltrating the SFMO anode with nickel nitrate solution followed by heat-treatment. The chemical compatibility between NiO and SFMO, the single cell performance as well as the cell performance stability of the Ni-modified SFMO anode using wet $CH_4$ (3% $H_2O$) as fuel were evaluated.

The SFMO powders were synthesized by a microwave-assisted combustion method. $Sr(NO_3)_2$, $Fe(NO_3)_3.9H_2O$ and $(NH_4)_6Mo_7O_{24}.4H_2O$ purchased from Alfa Aesar with high purity were used as metal precursors. Glycine and citric acid were used to assist the combustion process. The as-prepared ash was fired at 1000° C. for 5 h to form the perovskite structure. The LSGM electrolyte material was synthesized by the solid-state reaction and the LSCF cathode material was made by a citric-assisted combustion method.

Powder X-ray diffraction (XRD) patterns were recorded on a D/MAX-3C X-ray diffractometer with graphite-monochromatized Cu K$_\alpha$ radiation ($\lambda$=1.5418 Å) at a scanning rate of 5° min$^{-1}$ in the 2θ range of 10°-90°. Microstructural features were characterized by scanning electron microscopy (SEM, FEI Quanta and XL 30) equipped with an energy dispersive spectrometer (EDS).

Single cells were fabricated on the LSGM electrolyte substrate made from pressing LSGM pellets and then sintering at 1400° C. for 5 h. The inks of anode SFMO (with 10 wt % pore former) and cathode LSCF were then screen printed on the two sides of the LSGM electrolyte pellet. The effective area of the electrode was controlled by the area of the cathode which was about 0.33 cm$^{-2}$. The anode and the cathode together with the LSGM electrolyte were then co-fired in air at 1100° C. for 1 h. For the Ni modified anode, the SFMO anode of the co-fired cell was infiltrated with 0.5M $Ni(NO_3)_2$ solution and then fired at 500° C. for 1 h prior to the electrochemical testing.

Since Au is inert to methane oxidation, Au paste was used as the contact layer for current collection on the anode surface. Ambient air was used as oxidant. The flow rate of the fuel gas was set at 40 ml min$^{-1}$. Prior to any electrochemical measurement, the cell was stabilized for 10 h when the fuel gas was switched from $H_2$ to $CH_4$.

The chemical compatibility between SFMO and NiO was investigated by firing the mixed powders of SFMO and NiO (50:50 wt %) at 1000° C. for 10 h in air. The XRD pattern of the mixed powder is shown in FIG. 1. Only XRD peaks corresponding to those of NiO and SFMO are present, indicating that there is no chemical compatibility issue for Ni modified SFMO anode under the cell operating conditions.

Figure 2:
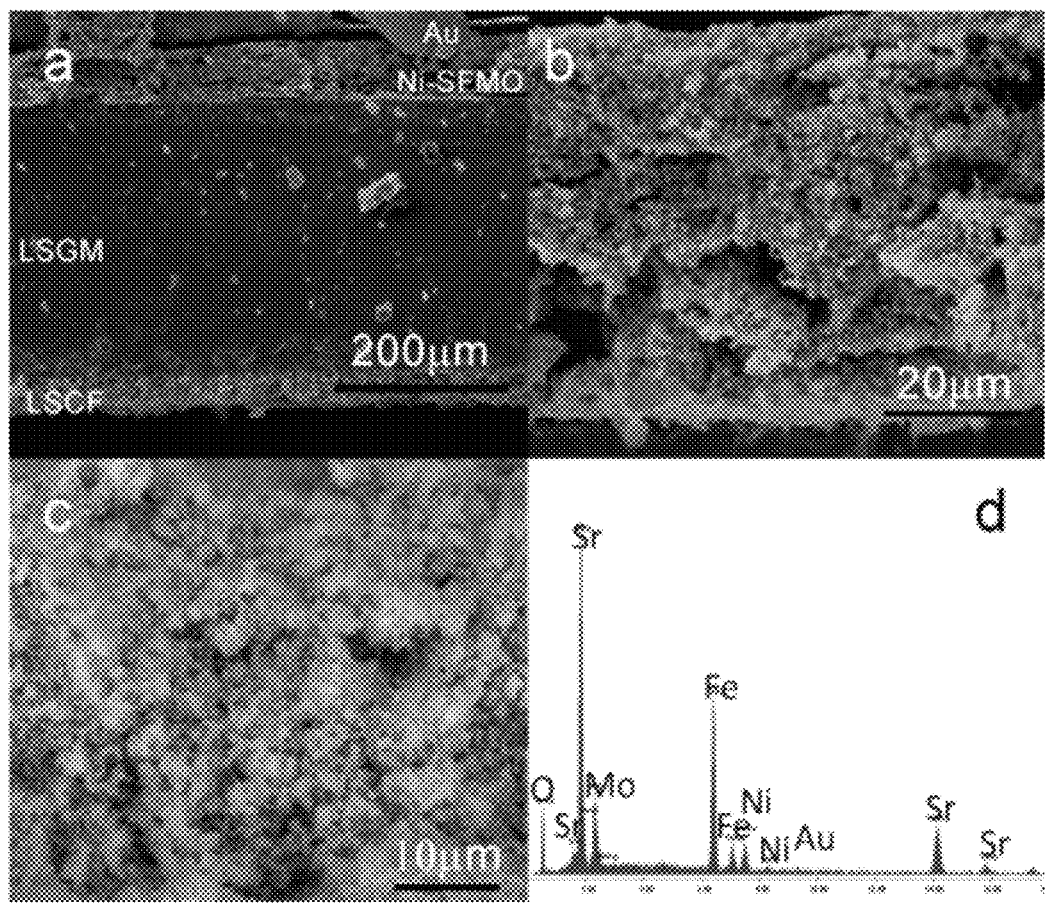
FIG. 2 illustrates a cross-sectional view of a cell with a Ni modified SFMO (Ni-SFMO) anode in accordance with certain aspects of the present disclosure.

The cross-sectional view of the cell with Ni modified SFMO (Ni-SFMO) anode after the electrochemical testing is presented in FIG. 2. As shown in FIG. 2a, the cell consists of a 300 μm thick LSGM electrolyte, a 60 μm thick Ni-SFMO anode and a 30 μm thick LSCF cathode. Since 10 wt % pore performer was initially added to the SFMO anode ink, some large pores can be observed in the anode structure as shown in FIG. 2b. Figure 2c shows the backscattered electron (BSE) image of the Ni-SFMO anode. As the atomic number of Ni is lower than the average atomic number of SFMO, the image of Ni particles should be darker. Besides the homogeneous SFMO particles, no obvious Ni-enriched zone can be observed in FIG. 2c. This is likely due to the low loading and high dispersion of Ni catalyst. According to the EDS element analysis shown in FIG. 2d, there is only about 2 wt % Ni in the anode.

Figure 3:
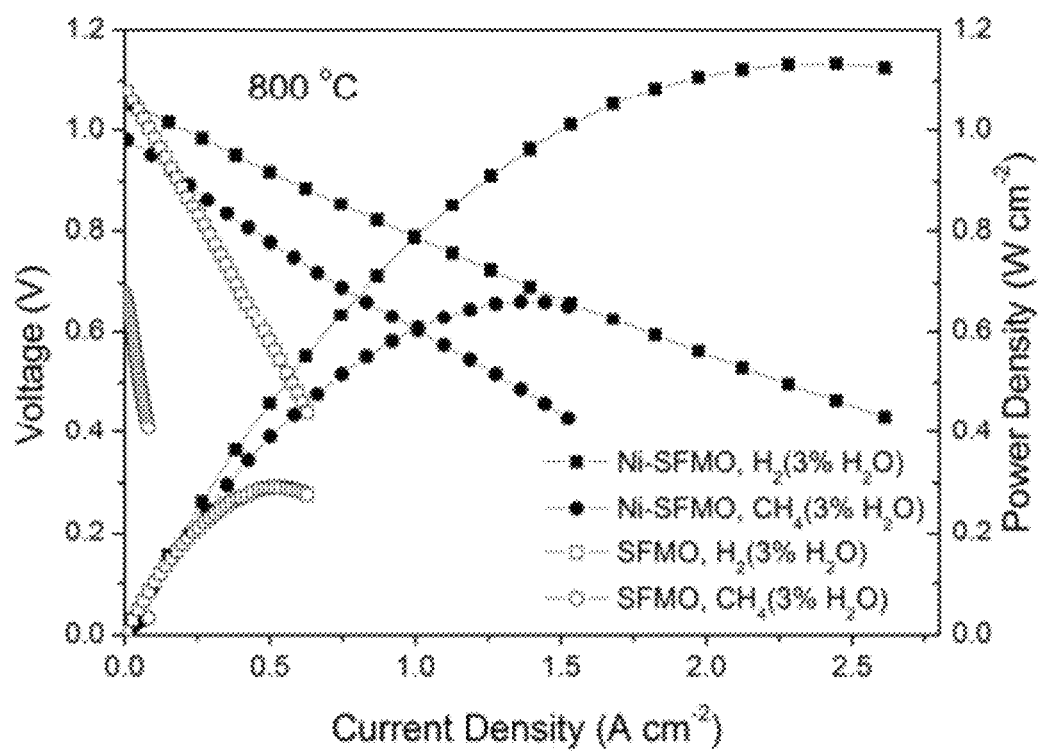
FIG. 3 illustrates the performance of fuel cells with either Ni-SFMO anode or SFMO anode in accordance with certain aspects of the present disclosure.

The performance of the fuel cells with either Ni-SFMO anode or SFMO anode at 800° C. is shown in FIG. 3. It can be seen that introduction of small amount of Ni phase in the SFMO anode has significantly enhanced the cell performance in both $H_2$ and $CH_4$. With the ambient air as the oxidant, the peak power density of the fuel cells with SFMO as anode is 0.291 W cm$^{-2}$ in wet $H_2$ (3 vol % $H_2O$) and only 0.033 W cm$^{-2}$ in wet $CH_4$ (3 vol % $H_2O$) at 800° C. It is noticed that the OCV of the cell drops to 0.68V with wet $CH_4$ (3 vol % $H_2O$) as the fuel, indicating the low catalytic activity of the SFMO material to $CH_4$. With the same testing conditions, the peak power density of fuel cells with Ni-SFMO as the anode reaches 1.134 W cm$^{-2}$ in wet $H_2$ (3 vol % $H_2O$) and 0.663 W cm$^{-2}$ in wet $CH_4$ (3 vol % $H_2O$). The OCV of the cells with the Ni-SFMO anode in wet $CH_4$ is 0.98 V, suggesting that the catalytic activity of the SFMO anode is greatly improved by loading a small amount of Ni catalyst in the SFMO phase. The performance of cells with the Ni-SFMO anode in $H_2$ and $CH_4$ is much higher than those of fuel cells with the ceramic anodes ever reported (e.g. the highest reported peak power density of cells is 0.735 W cm$^{-2}$ in $H_2$ with the $Sr_2CoMoO_6$ anode and 0.55 W cm$^{-2}$ in wet $CH_4$ (3 vol % $H_2O$) with the $Sr_{1.2}La_{0.8}MgMoO_6$ anode at 800° C.). High performance of the Ni—SFMO anode is likely due to not only the catalytic activity of the highly dispersed Ni particles, but also the high electrical conductivity and good electrochemical activity of the SFMO ceramics.

Figure 4:
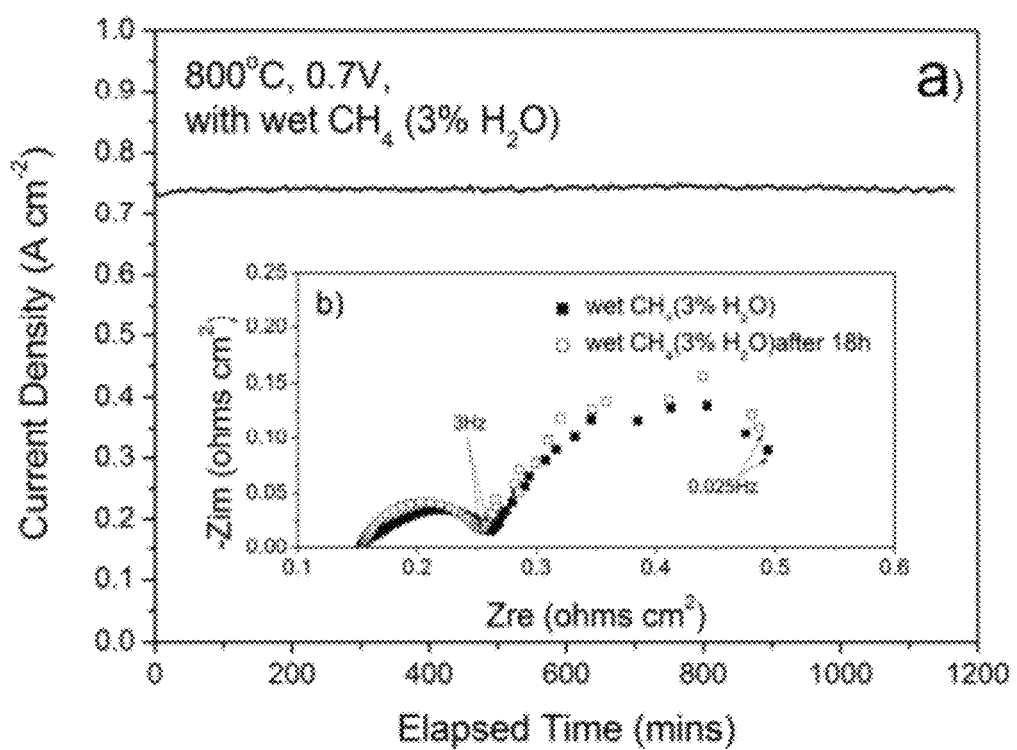
FIG. 4 illustrates the performance stability of cells with the Ni-SFMO anode in $CH_4$ in accordance with certain aspects of the present disclosure.

The performance stability of cells with the Ni-SFMO anode in $CH_4$ was investigated by recording the current density of the cell operating at 0.7V at 800° C. As shown in FIG. 4a, the cell performance is very stable in the tested period, indicating that Ni-SFMO anode has excellent catalytic activity and stability when directly operating on $CH_4$ fuel. The stability of the cell is further confirmed by the impedance spectra of the cells measured under open circuit conditions in $CH_4$ before and after the performance stability test. Very similar impedance spectra are obtained, indicating that Ni modified SFMO anode has good stability and no significant carbon deposition occurred upon operating the cell directly with $CH_4$ fuel. This result would be attributed to the enlarged reaction sites on the SFMO oxide and the high dispersion of fine Ni particles which may accelerate the anode electrochemical reactions and suppress carbon formation on the confined Ni surfaces.

By dispersing a small amount of Ni (~2 wt %) on the SFMO ceramic anode, performance of the cells with LSGM as electrolyte and LSCF as cathode has been dramatically improved both in $H_2$ and $CH_4$ as the fuel and ambient air as the oxidant. The improvement may be due to the high catalytic activity of Ni in electrochemical oxidation of $H_2$ and $CH_4$. The cell performance has also been very stable when operating with $CH_4$ fuel, indicating that the carbon formation on Ni surface can be suppressed by controlling the dispersion and loading of Ni on the SFMO anodes. Considering the simple anode fabrication process, the relatively low cost of the anode materials and the stable cell performance observed, Ni modified SFMO anode can be considered as a promising anode system for direct-methane solid oxide fuel cells.

In the interest of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure so as further described in such appended claims.

What is claimed is:

1. A method for fabricating a solid oxide fuel cell comprising:
    synthesizing a composition comprising a perovskite comprising $Sr_2Fe_{1.5}Mo_{0.5}O_{6-\delta}$;
    applying the composition on an electrolyte support to form an anode; and
    applying Ni to the composition on the anode, wherein from about 0.1 to about 5 weight percent of Ni is applied to the composition on the anode.

2. The method of claim 1, wherein the electrolyte support comprises $La_{0.9}Sr_{0.1}Ga_{0.8}Mg_{0.2}O_3$.

3. The method of claim 1, wherein the composition is synthesized by a microwave-assisted combustion method.

4. The method of claim 1, further comprising utilizing a dry-pressing method to form the electrolyte support.

5. The method of claim 1, wherein the composition is synthesized with a metal precursor.

6. The method of claim 1, wherein the Ni is applied to the composition in the form of $Ni(NO_3)_2$ solution.

7. The method of claim 6, wherein NiO is formed on the anode.

8. The method of claim 1, further comprising operating the anode as a cathode.

9. A solid oxide fuel cell comprising:
    an anode comprising a perovskite on an electrolyte support, the perovskite comprising $Sr_2Fe_{1.5}Mo_{0.5}O_{6-\delta}$; and
    wherein the anode further comprises Ni in an amount of from about 0.1 to about 5 weight percent of the anode.

10. The fuel cell of claim 9, wherein the electrolyte support comprises $La_{0.9}Sr_{0.1}Ga_{0.8}Mg_{0.2}O_3$.

11. The fuel cell of claim 9, wherein the perovskite is synthesized by a microwave-assisted combustion method.

12. The fuel cell of claim 9, wherein a dry-pressing method is utilized to form the electrolyte support.

13. The fuel cell of claim 9, wherein the perovskite is synthesized with a metal precursor.

14. The fuel cell of claim 9, wherein the Ni is in the form of NiO.

15. The fuel cell of claim 9, further comprising operating the anode as a cathode.

* * * * *